Nov. 5, 1935.     N. B. GREEN     2,019,699

FOLDING TRIGGER FOR SHUTTERS

Filed Jan. 30, 1935     2 Sheets-Sheet 1

Inventor:
Newton B. Green,

By
Attorneys

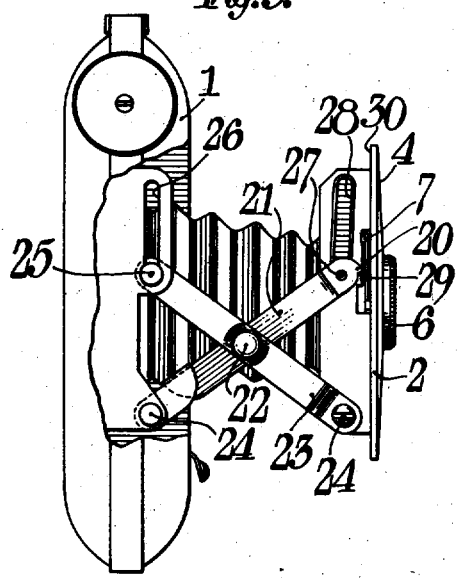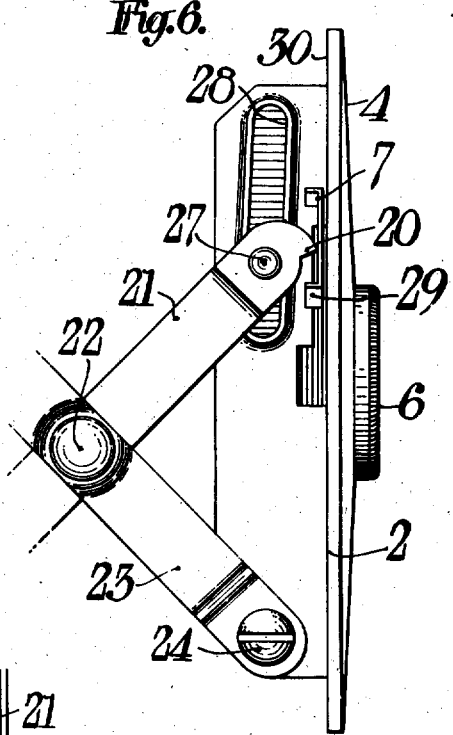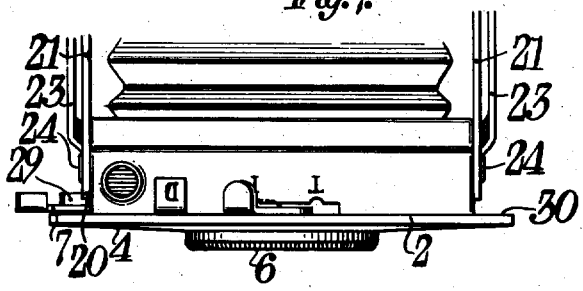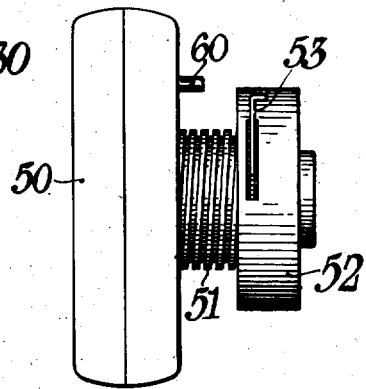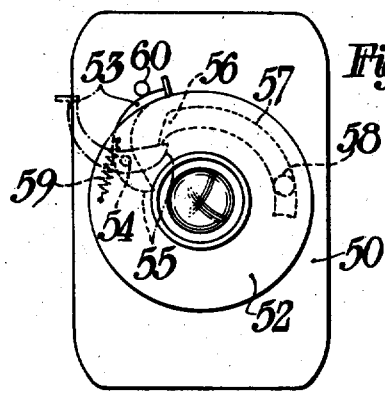

Patented Nov. 5, 1935

2,019,699

UNITED STATES PATENT OFFICE 2,019,699

FOLDING TRIGGER FOR SHUTTERS

Newton B. Green, Rochester, N. Y., assignor to Eastman Kodak Company, Rochester, N. Y., a corporation of New York Application January 30, 1935, Serial No. 4,116

REISSUED

9 Claims. (Cl. 95—53)

This invention relates to photography and more particularly to shutters for photographic cameras. One of the objects of my invention is to provide a photographic shutter particularly adapted for use on the miniature or small sized cameras in which the trigger can be of such size that it may be readily operated, the trigger being made to fold automatically so that it may also be enclosed in a camera casing or so that it may be made to fold flat against the shutter. Another object of my invention is to provide a trigger which is automatically projected into an accessible position when the camera is open and to provide a shutter trigger which is automatically retracted toward the shutter when the camera is closed. Other objects will appear from the following specification, the novel features being particularly pointed out in the claims at the end thereof.

The recent trend in camera construction is to provide the smallest possible camera casing for the size of the film used in the camera. Small size films are now quite widely used and it is difficult to provide a shutter actuating mechanism such as a shutter trigger of such a size that it will be accessible for operating the camera and yet of a size which will permit the camera to fold into the very limited space which is afforded by the camera casing. To overcome these difficulties, I have provided what I call a folding shutter trigger, which is automatically projected into an operative position when the camera is open and which is automatically retracted to a folded position when the camera is closed. By way of illustrating my invention, I have shown cameras of a known folding type equipped with a folding trigger. Obviously, my invention can be applied to advantage to a wide variety of different types of cameras.

Coming now to the drawings wherein like reference characters denote like parts throughout:

Fig. 5 is a side elevation with parts broken away, showing a camera equipped with my improved trigger as illustrated in Fig. 1;

Fig. 6 is a fragmentary detail of the camera shown in Fig. 5, but with the parts in a partially folded position;

Fig. 7 is a top plan view of the camera shutter and a portion of the camera front; the camera being the same as that shown in Figs. 1 and 5;

Fig. 8 is a side elevation of a second embodiment of my invention; and

Fig. 9 is a front elevation of the camera shown in Fig. 8.

Figure 1:
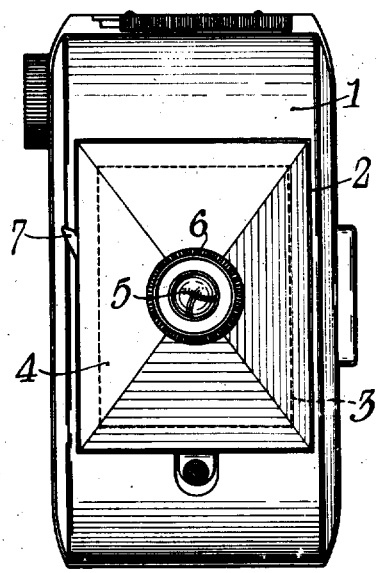
Fig. 1 is a front elevation of a folding camera of known type equipped with a camera trigger constructed in accordance with and embodying a preferred form of my invention.

In small sized cameras, it is desirable to have the shutter trigger projected into an accessible position so that it can be readily operated.

In the embodiment of my invention shown in Figs. 1-7 inclusive, the camera may be of the type having a body portion 1 and a front portion 2, the front portion carrying a shutter casing 3, a shutter cover 4, and an objective 5 in a cell 6.

The shutter 3 may be equipped with a shutter trigger 7, and, as shown in Fig. 1, when the camera has been opened to make an exposure, the trigger 7 projects to one side of the shutter cover plate 4, so that it can be readily operated.

In order to permit the shutter trigger 7 to fold and unfold in the preferred embodiment of my invention, I have constructed the shutter trigger of two parts, 7 and 8, each of which is pivoted upon a stud 9 so as to turn thereon.

Spring 10 tends to turn part 7 upon the stud 9 toward the shutter casing 3 and into a folded position. This movement of trigger 7 will not affect the trigger part 8, because as trigger 7 moves in the direction shown by the arrow in Fig. 2, the contacting edge 11 moves away from a lug 12 carried by the trigger part 8. This trigger part is normally held in the position shown in Fig. 1 by means of a spring 13.

Figure 2:
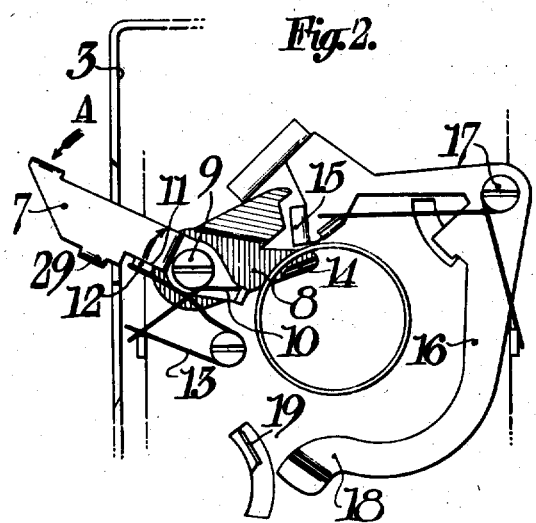
Fig. 2 is an enlarged fragmentary front elevation of the shutter and trigger shown in Fig. 1, but with the shutter cover removed, the trigger being in an unfolded position.

However, when the camera has been erected for making an exposure and the trigger is in the position shown in Fig. 2, an exposure can be made by depressing the end of the trigger as indicated by arrow A. As the trigger is depressed, the edge 11 will strike the lug 12 and the parts 7 and 8 will move together to make an exposure, the point 14 riding up under the end 15 of a master member 16, pivoted at 17 and having a shutter operating end 18 adapted to engage the trigger projection 19.

The construction of the shutter mechanism itself, aside from the trigger, forms no part of my present invention and is shown and described in United States Patent No. 1,966,313, W. A. Riddell, granted July 10, 1934.

The means for operating the movable trigger 7 towards a folded position is a spring 10 and the means for operating the trigger 7 to an accessible or unfolded position is the operating lug 20, carried by one of the folding struts 21 which support the camera front 2. This strut is pivoted at 22 to a second strut 23. Strut 21 is pivoted to a camera upon a stud 24.

Figure 3:
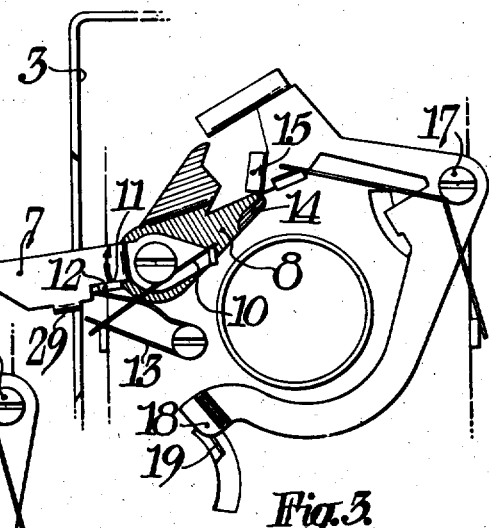
Fig. 3 is a view similar to Fig. 2, but with the parts shown in the position they assume after an exposure has been completed.
Figure 4:
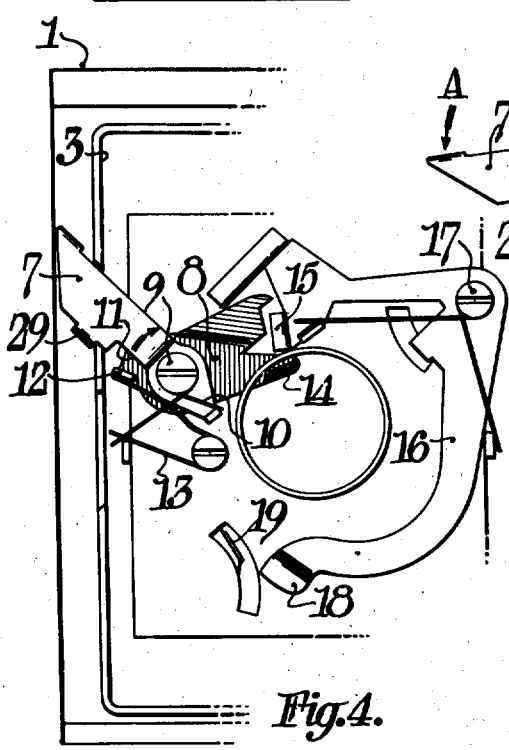
Fig. 4 is similar to Figs. 2 and 3, but with the trigger in a rest or folded position.

Strut 23 is pivoted at 24 to the camera front and at its opposite end a pin 25 may slide through slot 26. A pin 27 on strut 21 may slide in a slot 28 in the shutter front. Thus the shutter will always move parallel to the camera body 1 and as the struts approach a totally open position, member 21 will engage a lug 29 on the shutter trigger 7 and move the trigger downwardly into the position shown in Fig. 2 against the action of spring 10. The shutter is then in a position to make exposures. As the camera front 2 is moved toward the camera body 1, as illustrated in Fig. 6, member 20 moves away from the shutter trigger lug 29 and permits the shutter lever 7 to move toward the shutter casing and behind the flange 30 of the shutter cover so that the camera can be folded. Fig. 2 shows the position of the trigger when the camera is open ready for an exposure. Fig. 3 shows the position of the trigger after an exposure has been made and before the trigger has been released. Fig. 4 shows the trigger raised under the action of spring 10 into a position in which it lies behind the flange 29 of the shutter cover 4, so that it may fold into the camera body.

In another embodiment of my invention as illustrated in Figs. 8 and 9, the camera may consist of a simple body 50 having a threaded aperture to receive a screw threaded cylinder 51, which may carry a shutter 52 integrally therewith. The thread 51 is of such a pitch that a turn of approximately 380° will move the shutter from its folded position in which it lies against the body 50 to an open position as shown in Fig. 8.

The shutter 52 carries a trigger 53 which is pivoted inside of the camera shutter 52 upon a stud 54. The trigger is pivoted with an operating point 55 adapted to ride under the end 56 of a master member 57, which may turn upon a stud 58 and operate a shutter leaf in the usual manner. A spring 59 tends to move the trigger 53 into its unfolded position as shown in Fig. 9. However, when the shutter is turned in a counter clockwise direction to fold the camera—that is to bring the shutter 52 against the camera body 50—the shutter in turning through this angle moves toward the camera body and the trigger will come in contact with a pin 60 carried by the camera body, this pin causing the trigger 53 to move from the broken line position to the full line position in Fig. 9, against the action of spring 59. Thus the trigger will be moved toward the camera shutter into an inaccessible position in which it is not liable to be accidentally operated or to catch on any foreign object and become damaged.

As will be seen from the above two embodiments of my invention, it is not important whether the shutter trigger is held by spring pressure in a folded position or in an unfolded position since the chief object of my invention is to provide a shutter trigger which will automatically move into an accessible position as the camera is opened. This occurs against spring pressure in the first described embodiment of my invention, and under spring pressure in the second described embodiment of my invention.

It is obvious that triggers can be made to fold and unfold in accordance with my invention in a variety of different types of cameras and I contemplate as within the scope of my invention of such forms as may come within the terms of the appended claims.

Having thus described my invention, what I declare is new and desire to secure by Letters Patent of the United States is:

1. In a folding camera, the combination with a camera body, of a shutter therefor movably mounted thereon, a trigger movably mounted on the shutter and movable to and from a folded position in which the trigger lies close to the shutter as distinguished from an unfolded position in which the trigger projects from the shutter, and means for projecting the trigger from the shutter by moving the shutter from the camera body and into a picture taking position.

2. In a folding camera, the combination with a camera body, of a shutter therefor movably mounted thereon, a trigger movably mounted on the shutter and movable to and from a folded position in which the trigger lies close to the shutter as distinguished from an unfolded position in which the trigger projects from the shutter, a spring for moving the trigger in one direction, and means for rendering the spring ineffective by moving the shutter relative to the camera body, said spring and means cooperating to fold the trigger as the shutter is moved toward the camera body.

3. In a camera shutter, the combination with a shutter casing, of mechanism in said casing, a trigger for controlling said mechanism, a mount for the trigger on which the trigger may move idly with respect to said mechanism and into a folded position with respect to the casing.

4. In a camera shutter, the combination with a shutter casing, of mechanism in said casing, a trigger for controlling said mechanism, a mount for the trigger on which the trigger may move, said trigger comprising two parts adapted to move together to make an exposure, one part being adapted to project from the camera casing, a mount for said parts on which the part adapted to project from the camera casing may turn idly with respect to the other part and into a folded position, whereby the trigger section projecting from the camera casing may be folded toward the camera casing.

5. In a photographic shutter the combination with a shutter casing, of mechanism including a trigger mounted on the casing, the trigger comprising two relatively movable parts, one including a handle and having lost motion with respect to the other part, and a spring adapted to move one part to the extent of its lost motion whereby the handle portion may be moved towards the shutter casing.

6. In a photographic shutter the combination with a shutter casing, of mechanism in said casing, a trigger adapted to project from said casing, for controlling the mechanism, a pivotal mount for the trigger on which the trigger may move idly with respect to the shutter mechanism and means to move the trigger idly upon its mount towards the shutter casing carried inside of the shutter casing.

7. In a photographic shutter the combination with a shutter casing, of mechanism in said casing, a trigger adapted to project from said casing for controlling the mechanism, a pivotal mount for the trigger on which the trigger may move idly with respect to the shutter mechanism and a spring for moving the trigger upon its mount towards the shutter casing.

8. In a photographic camera, the combination with a camera body and a shutter, of means for moving the shutter from the camera body into an operative position, a shutter trigger movably mounted on the shutter and connections between said shutter trigger and said shutter moving means adapted to move the former to an operative position as the latter is moved to an operative picture taking position.

9. In a photographic camera, the combination with a camera body and a shutter, of means for moving the shutter from the camera body into an operative position, a foldable shutter trigger, means for holding the trigger in an inoperative folded position, and connection between the means for moving the shutter into an operative position and the foldable trigger for moving the latter to an operative position as the shutter is moved from the camera body towards its picture taking position.

NEWTON B. GREEN.